US010536425B2

(12) United States Patent
Rachitskiy et al.

(10) Patent No.: US 10,536,425 B2
(45) Date of Patent: Jan. 14, 2020

(54) CROSS-DOMAIN HTTP REQUESTS USING DNS REBINDING

(71) Applicant: PulsePoint, Inc., New York, NY (US)

(72) Inventors: Yevgeniy Rachitskiy, Chardon, OH (US); Leonid Litvin, Brooklyn, NY (US)

(73) Assignee: PulsePoint, Inc., New York, NY (US)

( * ) Notice: Subject to any disclaimer, the term of this patent is extended or adjusted under 35 U.S.C. 154(b) by 383 days.

(21) Appl. No.: 15/247,078

(22) Filed: Aug. 25, 2016

(65) Prior Publication Data

US 2017/0063778 A1 Mar. 2, 2017

Related U.S. Application Data

(60) Provisional application No. 62/210,317, filed on Aug. 26, 2015.

(51) Int. Cl.
*G06F 15/16* (2006.01)
*H04L 29/12* (2006.01)
*H04L 29/08* (2006.01)

(52) U.S. Cl.
CPC ...... *H04L 61/1511* (2013.01); *H04L 61/2007* (2013.01); *H04L 67/02* (2013.01)

(58) Field of Classification Search
CPC ..... H04L 67/02; H04L 61/1511; H04L 67/327
USPC ........................................................ 709/245
See application file for complete search history.

(56) References Cited

U.S. PATENT DOCUMENTS

| 7,970,939 | B1* | 6/2011 | Satish | H04L 29/12018 |
| | | | | 709/224 |
| 2012/0054828 | A1* | 3/2012 | Jiang | H04L 67/08 |
| | | | | 726/3 |
| 2014/0258383 | A1* | 9/2014 | Milne | H04L 67/10 |
| | | | | 709/203 |

OTHER PUBLICATIONS

Collin Jackson, et al., Protecting Browsers from DNS Rebinding Attacks, ACM Transactions on the Web (TWEB), vol. 3 Issue 1 (Jan. 2009).

(Continued)

*Primary Examiner* — Wing F Chan
*Assistant Examiner* — Andrew Woo
(74) *Attorney, Agent, or Firm* — Cambridge Technology Law LLC; David E. Boundy

(57) ABSTRACT

Cross-domain requests by DNS name rebinding. A domain name server at a first domain name receives an initialization request from a user agent device. The request designates a class of domain names to be resolved to an IP address belonging to a second domain name to which the user agent device seeks to issue a safe cross-domain request. That request will be directed to the first domain name, but serviced by a server belonging to the second. In a DNS cache of the user agent, the first domain name is bound to an IP address belonging to the first domain, and to an IP address belonging to the second domain name. This binding is established by providing two or more IP address resource records resolving the designation of the class of domain names, having the relevant IP addresses, and ensuring that the first domain name is pinned to the first IP address in a DNS cache of the user agent device, and that others of the IP addresses are stored in the user agent's DNS cache as alternative binding(s) to the first domain name, and then invalidating the first IP address, so that the binding falls through to an alternative one of the IP addresses.

54 Claims, 2 Drawing Sheets

(56) References Cited

OTHER PUBLICATIONS

Shaumik Daityari, Working With and Around the Same-Origin Policy, http://www.sitepoint.com/working-around-orgin-policy (Feb. 28, 2014).

Rebind DNS Rebinding Tool, https://code.google.com/p/rebind (2010).

Rebind DNS Rebinding Too FAQ http://code.google.com/p/rebind/wiki/FAQ (2010).

Georgios Kokkinopoulos, DNS rebinding attacks, Monterey, California. Naval Postgraduate School Institutional Archive (Sep. 2009).

* cited by examiner

CROSS-DOMAIN HTTP REQUESTS USING DNS REBINDING

This application is a non prov. of U.S. Provisional App. Ser. No. 62/210,317, filed Aug. 26, 2015.

BACKGROUND

This application relates to routing of requests in a computer network, and assembling content from multiple computers of the network for consolidated presentation to a user.

In order to enforce security, internet browsers do not permit cross-domain requests. That is, a document served from one domain name may execute code that issues requests to the same domain, but not to any other domain. Similarly, under the "same origin policy," a web browser permits scripts contained in a first web page to access data in a second web page, but only if both web pages have the same origin. An origin is defined as a combination of URI scheme ("Uniform Resource Identifier" schemes include http, ftp, mailto, and file), hostname, and port number.

Known techniques for cross-domain requests include CORS and iframe based libraries such as xdomain (github.com/jpillora/xdomain).

SUMMARY

In general, in a first aspect, the invention features a method. A user agent device issues an initialization request to a domain name server at a first domain name. The initialization request designates a class of domain names to be resolved to an IP address belonging to a second domain name, from which the user agent device seeks to issue a safe cross-domain request to be subsequently directed to the first domain name. The second domain name is a public domain name that is different than the first domain name. A binding of the first domain name to an IP address belonging to the second domain name is established in a DNS address cache of the user agent device. The agent device sends a cross-domain HTTP request addressed to the first domain name and routed to the IP address that belongs to or is to be resolved to a computer of the second domain name, to be serviced by a computer at the second domain name.

In general, in a second aspect, the invention features a domain name server. One or more processors are designed to execute instructions. An internet connection is programmed to receive and send messages at a first domain name. One or more nontransitory, machine-readable memories store program instructions for execution by the processor(s). The instructions programmed to cause the processor(s) to: (1) receive an initialization request from a user agent device, the initialization request designating a class of domain names to be resolved to an IP address belonging to a second domain name, to which the user agent device seeks to issue a safe cross-domain request to be subsequently directed to the first domain name, the second domain name being a public domain name that is different than the first domain name; (2) establish in a DNS address cache a binding of the first domain name to an IP address belonging to the second domain name, and to send messages to enable the user agent device to issue an HTTP request addressed to the first domain name and to be routed to the IP address that belongs to or is to be resolved to a computer of the second domain name, to be serviced by a computer at the second domain name.

In general, in a third aspect, the invention features a method. A user agent device issues an initialization request to a domain name server at a first domain name. The initialization request designates a class of domain names to be resolved to an IP address belonging to a second domain name from which the user agent device seeks to request a safe cross-domain service. The second domain name is different than the first domain name. The user agent device receives a response from the domain name server, the response returning to the user agent device two or more IP address resource records resolving the designation of the class of domain names. One of the returned IP address resource records has a first IP address belonging to a computer within the domain of the first domain name. Other of the returned IP address resource records have IP addresses for computers within domains that belong to the designated class of domain names, and have been evaluated by the domain name server to be eligible to service the cross-domain service requested by the user agent. The first domain name is pinned to the first IP address in a DNS cache of the user agent device, and others of the IP addresses are stored in the user agent's DNS cache as alternative binding(s) to the first domain name. The user agent device, in response to a request to the first IP address, unpins the first IP address and binds to the first domain name an alternative one of the IP addresses chosen from among the other stored IP addresses. The user agent device issues a request to a computer of the second domain name by sending a request addressed to the first domain name. In the DNS cache, the first domain name is resolved to an IP address that belongs to or is to be resolved to a computer of the second domain name.

In general, in a fourth aspect, the invention features a domain name server. The server has a processor and one or more nontransitory, machine-readable memories. A program is programmed as follows. The server receives an initialization request from a user agent device. The initialization request designates a class of domain names to be resolved to an IP address belonging to a second domain name to which the user agent device seeks to issue a safe cross-domain request. The second domain name is different than the first domain name. The server sends a response to the user agent device. The response provides two or more IP address resource records resolving the designation of the class of domain names. One of the IP address resource records has a first IP address belonging to a computer within the domain of the first domain name. Other of the provided IP address resource records have IP addresses for computers within domains belonging to the designated class of domain names. These other computers are evaluated by the domain name server to be eligible to service the cross-domain request to be subsequently issued by the user agent. The first domain name is pinned to the first IP address in a DNS cache of the user agent device, and other of the IP addresses are stored in the user agent's DNS cache as alternative binding(s) to the first domain name. A message sent to the user agent device causes the user agent device to unpin the first IP address, and to bind the first domain name to an alternative one of the IP addresses from among the other stored IP addresses. The user agent may then issue an HTTP request addressed to the first domain name and to be routed to an IP address that belongs to or is to be resolved to a computer of the second domain name, to be serviced by a computer at the second domain name.

In general, in a fifth aspect, the invention features a method. Two or more IP addresses for a domain name are established in a DNS cache. A request is sent to the domain name, and as part of processing this request, the domain name is resolved to a one of the IP addresses in the DNS cache. When a reply is received, the reply is evaluated to ascertain the source of the reply. If the reply came from an undesired node the method is repeated until a response from the desired source is obtained. Addresses of undesired sources are invalidated in the DNS cache.

Embodiments of the invention may include one or more of the following features. The initialization request may designate the class of domain names as qualification of a fully-qualified hostname within the first domain name. The initialization request may identify a specific second domain name directly, in the initialization request. The initialization request may specify a class of domain names specified based on a designation of a service requested by the user agent. That service specification may be resolved to a specific IP address belonging to a computer belonging to the second domain name from among a plurality of computers having the capability to provide the requested service. A pool of IP addresses corresponding to the first domain name may be managed, with an IP address to be checked out of the pool for a period of time to maintain disambiguation among pending requests to bind the first domain name to IP addresses belonging to the second domain name. The binding may be established by sending a request from the user agent device that is designed to fail, and on receipt of a fail response, an action may be taken toward establishing the binding. In response to a request from the user agent to test an ordering of the IP addresses stored in the user agent's DNS cache, receiving a failure response designed to indicate to the user agent that the IP addresses are not in a desired order, and in response thereto, invalidating the received IP addresses for future requests to desired service. In response to a request designed to invalidate the pinned IP address in the user agent's DNS cache, a failure response may cause a rebinding of the first domain name to another of the addresses received in the IP address resource records. The pinning may be ensured by a loop of attempts to establish the pin of a first IP address to the first domain name. The pinning may be ensured by issuing a set of parallel requests to establish the pin of a first IP address to the first domain name.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

DESCRIPTION

I. Overview

Figure 1:
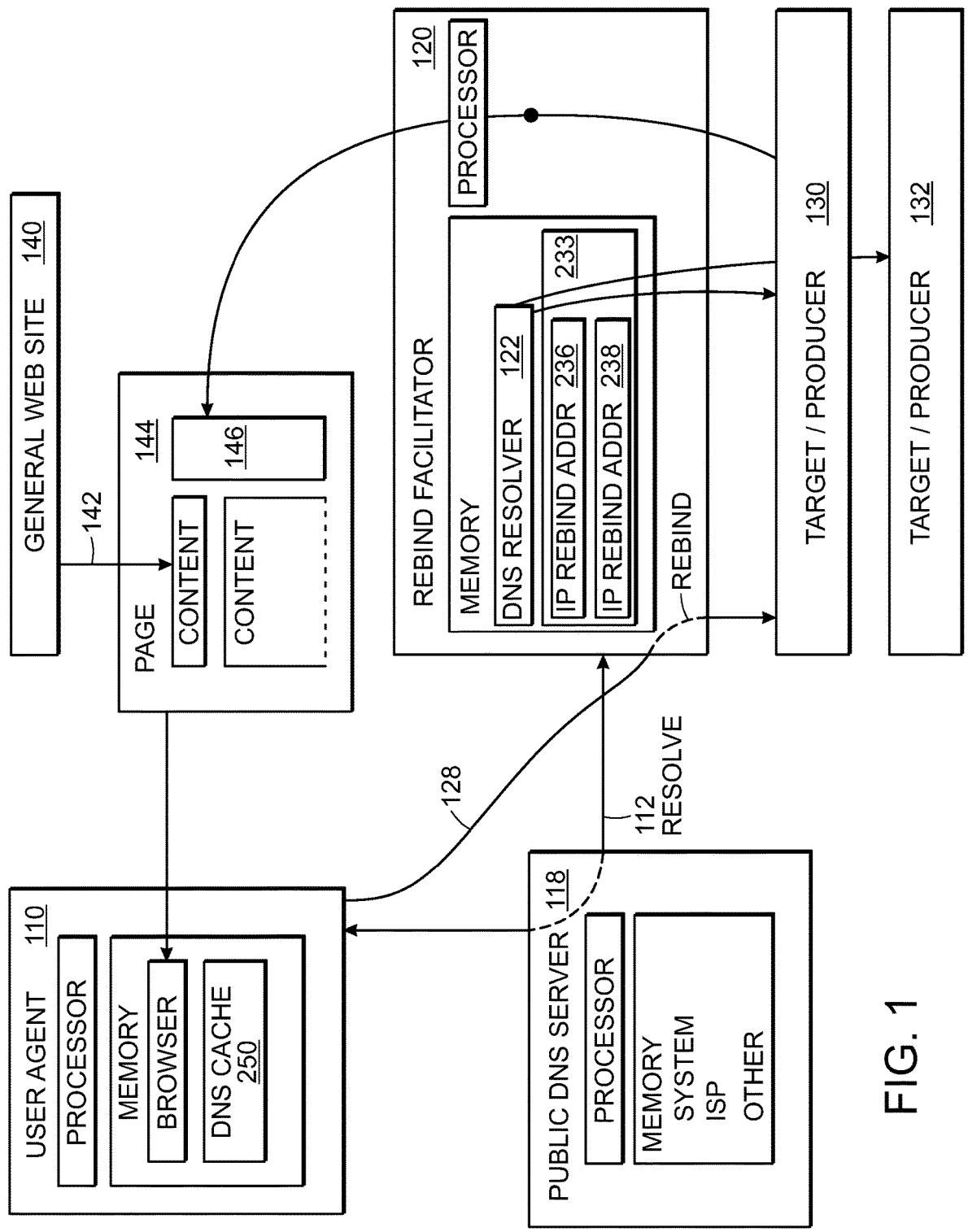
FIG. 1 is a block diagram of a computer system.

Referring to FIG. 1, a set of internet nodes may be configured and programmed to permit cross-domain calls from a user's browser or user agent 110. When user agent 110 issues a cross-domain request 112 to a rebind facilitator 120, rebind facilitator 120 and user agent 110 may cooperate to establish a path through which user agent 110 may make cross-domain requests 128 directed to rebind facilitator 120 that can be rerouted and satisfied (at least in part) by target/producer 130, even though a cross-domain request 128 is nominally addressed to the domain of rebind facilitator 120, and target/producer 130 is a separate domain.

Figure 2:
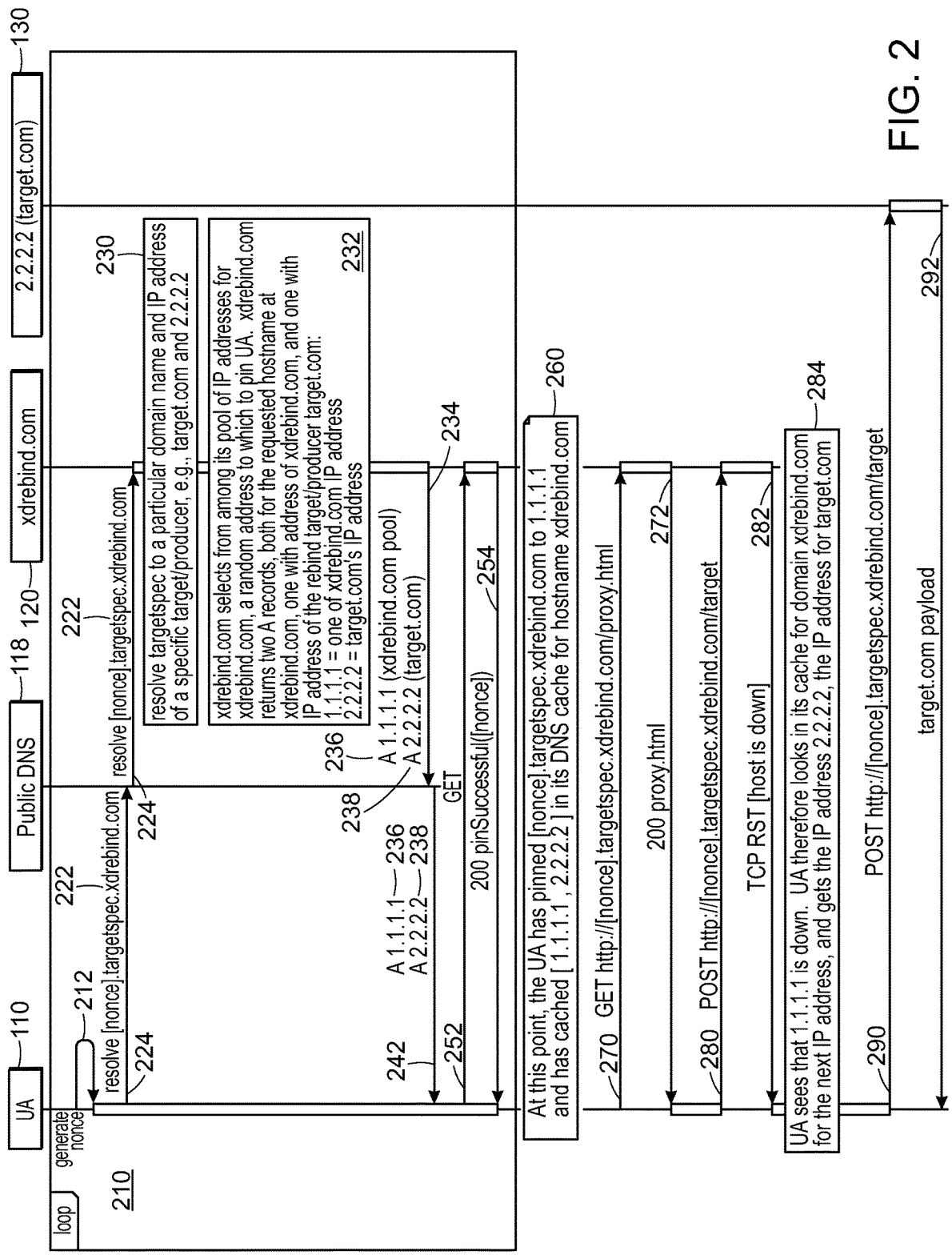
FIG. 2 is a sequence diagram of requests and responses among the nodes of the network of FIG. 1.

Referring to FIG. 2, the overall process may proceed in two steps. First, user agent 110 and rebind facilitator 120 may cooperate on a protocol that ends with two entries in DNS cache 250 of the user agent for the domain name of rebind facilitator 120: a first one that binds that domain name to an IP address for rebind facilitator 120 itself, and a second entry that binds the domain name to an IP address for target/producer 130. Second, rebind facilitator 120 may cause the first host-to-IP entry to be purged from DNS cache 250, leaving only the DNS entry for the domain name of rebind facilitator 120 to the IP address of target/producer 130. After those two steps, further requests from user agent 110 to the domain name of rebind facilitator 120 will be routed by IP address to target/producer 130.

This technique may permit cross-domain requests without requiring a specific request or HTTP response origin headers (CORS) to enable the facility. The technique may provide greater reliability. This technique may provide lower latency, and greater access speed between the browser and end-point server. It may provide ability to execute certain HTTP requests that are not easily made in existing cross-domain request techniques. It may permit more of the computation to implement software requiring the use of cross domain communication to be done in a user's browser, offloading work from various servers, thereby enabling scaling. The technique may permit the target/producer application to take advantage of user-specific data, for example, cookies stored by the browser, specific sizes of frames, user agent IP address information, and similar browser properties and state. The technique may permit cross-domain requests without requiring a prior opt-in. The technique may permit both HTTP GET and POST operations to the target server, rather than GET only.

Cross-domain requests facilitated by the technique described here may be useful in many contexts. For example, rebind facilitator may perform some form of preprocessing before passing request 112, 128 on to target/producer 130, or may perform some form of arbitration or negotiation among multiple target/producers 130, 132, before deciding to which of the several target/producers 130, 132 to forward request 112, 128. Cross-domain requests may be useful in single-sign-in services where a user signs in to a single web site, and that single-sign in permits access to multiple underlying sites. Cross-domain requests may be useful in providing consolidated access to multiple sites. Cross-domain requests may be useful in advertising, for example where an ad server conducts an auction between multiple advertisers to choose one of them for this request, for placement of advertising from target/producers 130, 132 on a page by web site 140.

II. Configuration

Referring again to FIG. 1, user agent 110 may be a conventional browser. Most modern browsers include a DNS cache 250 that holds translations of hostnames (also known as "fully qualified domain names" or FQDN) to IP addresses.

Web site 140 may be essentially any web site—news, online shopping, e-business, etc.—that delivers content 142 in a page 144 to user agent 110. The page may have one or more components, for example frame 146, that includes content to be obtained from another domain. The cross-domain content may be data used to compute some portion of data in page 144, or may be an ad for display in page 144. In other cases, web site 140 may deliver a JavaScript or other executable code to user agent 110 so that much of the cross-domain processing is handled at user agent 110, bypassing web site 140.

Rebind facilitator 120 may be a domain with multiple IP addresses. Rebind facilitator 120 may maintain some of those IP addresses in a pool 233 for use in step 232, described below. Rebind facilitator 120 may have its own DNS resolver 122, with IP addresses of various target/producer nodes 130, 132.

Target/producer nodes 130, 132 may be distributors of content to be included in page 144. Target/producer nodes 130, 132 may supply user-specific information for multi-player games. In other cases, target/producer nodes 130, 132 may provide ads for display in frame 146.

III. Operation

Referring again to FIG. 2, when a use at a browser or user agent 110 requests a page from web site 140, in order to generate some portion 146 (of FIG. 1), web site 140 may pass a JavaScript to user agent 110 for execution, which performs the following steps to obtain content 146 using a cross-domain request.

Loop 210 repeats steps 212 through 254 until response 254 returns a successful confirmation that the desired state has been created in the user agent's DNS translation cache 250. In other cases, the steps shown inside loop 210 may be performed as a set of parallel requests issued simultaneously.

User agent may begin (step 212) by generating a nonce value, a single-use value that ensures uniqueness and trackability of each initial invocation of cross-domain call facility of FIG. 2.

User agent assembles a one-time hostname 222 that will be used for cross-domain requests, and issues that hostname in a resolve request 224 to rebind facilitator 120. The form is nonce.targetspec.xdrebind.com where:
nonce is the nonce value from step 212
targetspec is a classification of target/producer 130 to which user agent 110 will seek to issue a cross-domain request.
xdrebind.com is the domain name for rebind facilitator 120.

Because xdrebind.com is used as the domain name, conventional public DNS servers 118 will route the request to xdrebind.com for host name to IP address resolution service.

When rebind facilitator 120 receives resolve request 224, it may first evaluate (step 230) the targetspec portion of hostname 222 to determine where future requests should be rebound. Targetspec may specify target/producer at whatever level of granularity, specificity, or generality is recognized by rebind facilitator 120. In some cases, targetspec may be a classification name by which user agent 110 requests a node from among a class, so that rebind facilitator 120 may choose an appropriate domain name from the requested. For example, if targetspec is "icecream," rebind facilitator may choose to resolve to "benandjerrys.com" "haagendazs.us," "breyers.com," "baskinrobbins.com," or a web site for some local brand, depending on whatever criteria rebind facilitator 120 considers relevant. In other cases, hostname 222 may directly name the domain name of desired endpoint target/producer 130, targetspec may be the literal text of a domain name. In other cases, if the user is likely interested in news in some subject matter field, targetspec may specify that subject matter field, and rebind facilitator 120 may select from among various news sources likely to be of interest to the user. In other cases, targetspec may specify a broker of advertising, and rebind facilitator 120 may select among possible domains to supply an ad into frame 146 (FIG. 1) of page 144, for example, by an auction process. User agent 110 and rebind facilitator 120 may use whatever shorthand they agree between themselves, for example, a simple number-to-hostname catalog. In any case, rebind facilitator 120 may evaluate targetspec and may choose an IP address of an appropriate target/producer 130 to provide to user agent 110 to which to bind hostname 222.

At step 232, rebind facilitator 120 may maintain a pool (233 of FIG. 1) of IP addresses that are all assigned through the DNS system to xdrebind.com, the domain name for rebind facilitator 120. From that pool, rebind facilitator 120 may select an IP address to which the domain name for rebind facilitator 120 is to be pinned in the DNS translation cache 250 of user agent 110. The pool of IP addresses is large enough so that from any single requesting IP address, each attempt to pin IP addresses (between resolve request 224 through response 254 of FIG. 2) that is currently "in flight" has a unique pair (source IP address, pool target IP address), to allow disambiguation and tracking. The pool should be large enough to allow for a single user agent 110 to make multiple requests concurrently, for example multiple tabs and requests from a single browser, and to allow for multiple user agents behind a single router that all use a single IP address, and still maintain uniqueness for the "in flight" time while a request is pending to bind the first domain name to an IP address belonging to the second domain name. An IP address from the pool is "checked out" and unavailable for requests originating from a single IP address and port pair (though that same IP address may be concurrently assigned to other rebinding requests originating from other IP addresses and ports). The "checked out" (with respect to an address/port pair) and "in flight" time begins with resolve request 222 and then ends when (a) the attempt to bind fails in response to request 252, (b) when the attempt succeeds, at the time of response 282 after the IP address is released, or (c) after a timeout, which may be in the range of five seconds.

Rebind facilitator 120 may prepare a response 234 that has two A records, both giving translations for hostname 222. One of the A records 236 may the IP address for xdrebind.com, the rebind facilitator 120, drawn from pool 233. This is shown as address 1.1.1.1 in FIG. 2. The other of the A records 238 has an IP address for target.com, from step 230. This is shown as address 2.2.2.2 in FIG. 2.

The DNS protocol atop Internet Protocol defines several classes of resource records. Among these, at least two specify IP addresses. IPv4 uses 32-bit IP addresses, returned in A records. IPv6 uses 128-bit IP addresses, returned in AAAA records.

During the trip back from Rebind facilitator 120 to user agent 110, the reply may traverse (240) one or more public DNS servers, firewalls, etc. in the public network or in the local area network for user agent 110. Those DNS servers, etc. 122 may cause the two A records 236 in reply 234 to be reordered before they arrive as reply message 242 back at user agent 110. This reordering is unpredictable.

In order to undo the reordering, and obtain a predictable ordering of the two A records in DNS cache (250 of FIG. 1) of user agent 110, user agent 110 may send a query 252 to hostname 222 for a resource that only exists on rebind facilitator 120, not on target/producer 130. DNS cache 250 of user agent 110 may resolve hostname 222 to the first cached IP address, which may in turn be either IP address for rebind facilitator 120 (1.1.1.1 in FIG. 2) or for target/producer 130 (2.2.2.2 in FIG. 2), depending on whether A records 236, 238 were or were not reordered during the trip 240. If the first IP address is the IP address for rebind facilitator 120, rebind facilitator 120 may respond with a success code 254, and loop 210 may terminate with a success.

In some cases, response 254 may include a payload (proxy.html). A proxy.html file may permit the parent frame to request content (for example through XHR (XMLHttpRequest) requests) to the domain name that is used to request the proxy.html file. In this case, proxy.html file 272 from the domain of rebind facilitator 120 may permit user agent 110 to issue requests on behalf of page 144 to hostname 222 ([nonce].targetspec.xdrebind.com in FIG. 2) because hostname 222 is within the domain of rebind facilitator 120, the domain name that issued proxy.html. The proxy.html file may typically be stored in an iframe 146 in page 144 at user agent 110. The combination of this proxy.html file and the technique of FIG. 2 may permit user agent 110 to make cross-domain requests on behalf of page 144 that go directly to target/producer 130. In this case the checkout of IP address 238 to the IP address/port of user agent 110 is held a while longer, until the TCP RST 282 or a timeout.

If the two A records 236, 238 were reordered in transit, and the first IP address is for target/producer 130, then query 252 will fail, and the "checkout" of IP address 238 to the IP address/port of user agent 110 may be released. In this case, loop 210 continues, starting with a new nonce value 214.

At point 260, the user agent's DNS cache 250 has pinned the hostname 222 nonce.targetspec.xdrebind.com to IP address 236 (1.1.1.1 in FIG. 2), and DNS cache 250 has the IP address 238 (2.2.2.2 in FIG. 2) as a secondary translation for the same domain name.

In cases where proxy.html was not obtained by user agent 110 during the process of loop 210, user agent 110 may request a proxy.html file (as described above in connection with response 254), and it will be returned in response 272. If the proxy.html file was obtained earlier, then request 270 and response 272 may be omitted.

Rebind facilitator 120 may block all TCP SYN packets that originate from user agent 110 directed to hostname 222 at the IP address 236 that was returned in response 234 on the destination TCP port for the HTTP request that triggered the pinning process (1.1.1.1:80 in FIG. 2), for a period of time, for example, five or ten seconds. This may cause user agent 110 to unpin that IP address 236 and purge it from its DNS cache 250.

User agent 110 may send a POST 280 to hostname 222 via TCP port described in the previous paragraph. The content of POST 280 is essentially irrelevant, because it is intended to fail. Rebind facilitator 120 may recognize that the POST is directed to IP address 236, so rebind facilitator 120 may respond with a TCP RST (reset) 282. This recognition may be based on recognition of the combination of IP address and port 236, and the originating IP address for user agent 110. In other cases, the recognition may be based on hostname 222. The RST signals to user agent 110 that hostname 222 is down and unavailable. User agent 110 may respond (step 284) by removing the entry for IP address 236 (1.1.1.1 in FIG. 2) from its DNS cache 250.

This leaves IP address 238 (2.2.2.2 in FIG. 2) as the cached IP address for hostname 222, [nonce].targetspec.xdrebind.com (step 284). This allows user agent 110 to make XHR requests to hostname 222, which user agent's DNS cache 250 will route directly to the cached IP address 238 (2.2.2.2 in FIG. 2).

Any remaining reservation of IP address 236 from pool 233 may now be released.

User agent 110 may then interact with the target/producer 130 as it would normally, except using hostname 222 rather than with the ordinary domain name for target/producer 130. For example, POST 290 shows a POST message containing a payload specific to a protocol defined for the desired interaction between user agent 110 and target (for example, the openrtb protocol for advertising), and target 130 responds 292 with the response that would typically occur under this protocol. From this point forward, the interaction between user agent 110 and target/producer 130 is conventional (again, with the substitution of hostname 222).

IV. Additional and Optional Features

Hostname 222 may encode additional information to be communicated between user agent 110, rebinding facilitator 120, and target 130. For example, during some phases of the process of FIG. 2, hostname 222 may include a device information and status information to indicate the state of the rebinding process, and what type of reply is expected for a particular request form, IP address, and port. Hostname 222 may be supplemented with a port number, which may be used to transfer TCP port information, to tune selection of IP addresses, for example in step 232.

Target/producer 130 may inspect the HTTP HOST header of all incoming requests and reject requests with a HOST header value that does not match the "direct" hostname at which the target is configured to provide a service. For example, the HTTP server at www.target.com can opt out of from this rebinding technique by evaluating the value of the HTTP HOST header in all HTTP messages it receives. If this HOST header is not equal to www.target.com, the server can reject the request (returning an error code or a redirect).

User agent device 110 may be any appropriate computer, smartphone, or other device equipped to browse or otherwise access the internet. Rebind facilitator 120, target/producer 130, and any other computers may be appropriate computer hardware with appropriate software. Each of these devices typically has a microprocessor and one or more nontransitory, machine-readable memories for storing programs for execution by the microprocessor, scripts, and data. Various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in one or more computer programs, or one or more scripts. The processing may be performed on one or more microprocessors, central processing units (CPUs), computing devices, microcontrollers, digital signal processors, or like devices or any combination thereof. Programs that implement the processing, and the data operated on, may be stored and transmitted using a variety of media. In some cases, hard-wired circuitry or custom hardware may be used in place of, or in combination with, some or all of the software instructions that can implement the processes. Algorithms other than those described may be used.

Programs and data may be stored in various media appropriate to the purpose, or a combination of heterogeneous media that may be read and/or written by a computer, a processor or similar device. The storage may include non-volatile media, volatile media, optical or magnetic media, dynamic random access memory (DRAM), static ram, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge or other memory technologies. Transmission media include coaxial cables, copper wire and fiber optics, including the wires that comprise a system bus coupled to the processor.

In some cases, the processing may be performed in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed variations, modifications and variations are within the literal scope of the following claims, and others are equivalent.

The invention claimed is:

1. A method, comprising steps of:
at a domain name server at a first domain name, receiving an initialization request from a user agent device, the initialization request designating a class of domain names to be resolved to an Internet Protocol (IP) address belonging to a second domain name to which the user agent device seeks to issue a safe cross-domain request to be subsequently directed to the first domain name, the second domain name being a public domain name that is different than the first domain name;
establishing in a Domain Name System (DNS) address cache at the user agent device a binding of the first domain name to an IP address belonging to the second domain name, by:
sending one or more responses to the user agent device, the one or more response(s) providing two or more IP address resource records resolving the designation of the class of domain names:
one of the IP address resource records having a first IP address belonging to a computer within the domain of the first domain name,
other of the provided IP address resource records having IP addresses for computers within domains belonging to the designated class of domain names, and having been evaluated by the domain name server to be eligible to service the safe cross-domain request to be subsequently issued by the user agent device;
ensuring that the first domain name is pinned to the first IP address in the DNS address cache of the user agent device, and that, simultaneously, at least one other of the IP addresses from the IP address resource records is/are stored in the user agent device's DNS address cache as alternative binding(s) to the first domain name;
sending a message to the user agent device to cause the user agent device to unpin the first IP address, and to bind the first domain name to an alternative one of the IP addresses from among the other stored IP addresses, and
sending messages to enable the user agent device to issue an HTTP request addressed to the first domain name and to be routed to the IP address that belongs to or is to be resolved to a computer of the second domain name, to be serviced by a computer at the second domain name.

2. A computer system, comprising:
one or more processors designed to execute instructions;
one or more non-transitory, machine-readable memories storing program instructions for execution by the one or more processor(s), the instructions programmed to cause the one or more processor(s) to:
issue an initialization request to a domain name server at a first domain name, the initialization request designating a class of domain names to be resolved to an internet protocol (IP) address belonging to a second domain name, from which a user agent device is to seek to issue a safe cross-domain request to be subsequently directed to the first domain name, the second domain name being a public domain name that is different than the first domain name;
in a Domain Name System (DNS) address cache, establish a binding of the first domain name to an IP address belonging to the second domain name; and
send a cross-domain Hypertext Transfer Protocol (HTTP) request addressed to the first domain name and routed to the IP address that belongs to or is to be resolved to a computer of the second domain name, to be serviced by a computer at the second domain name.

3. The computer system of claim 2, wherein:
the initialization request designates the class of domain names as qualification of a fully-qualified hostname within the first domain name.

4. The computer system of claim 2, the instructions further programmed to cause the one or more processor(s) to:
receive a response from the domain name server, the response to return to the user agent device two or more IP address resource records to resolve the designation of the class of domain names:

one of the returned IP address resource records having a first IP address belonging to a computer within the domain of the first domain name, other of the returned IP address resource records having IP addresses for computers within domains belonging to the designated class of domain names, and having been evaluated by the domain name server to be eligible to service the safe cross-domain request to be subsequently issued by the user agent device;

ensure that the first domain name is pinned to the first IP address in a DNS address cache of the user agent device, and that, simultaneously, at least one other of the IP addresses from the IP address resource records is/are stored in the user agent device's DNS address cache as alternative binding(s) to the first domain name.

5. The computer system of claim 4, the instructions further programmed to cause the one or more processor(s) to:

unpin the pinned first IP address and to bind to the first domain name an alternative one of the IP addresses chosen from among the stored IP addresses.

6. The computer system of claim 2:

the instructions to establish a binding of the first domain name to an IP address belonging to the second domain name being further programmed to cause the one or more processor(s) to:

in the DNS address cache, establish, concurrently, two or more IP addresses for translation of the first domain name;

send a request over the internet to the first domain name, including resolving the first domain name of the request to be resolved to the first of the IP addresses in the DNS address cache;

receive a reply to the request, and to evaluate the source of the reply to ascertain whether that source is an IP address whose binding to the single domain name is not a desired IP address translation of the single domain name; and if the evaluation determines that the reply is received from an undesired node of the internet, invalidate the translation from the first domain name to IP addresses of the undesired node from the DNS address cache.

7. The computer system of claim 2, the instructions further programmed to cause the one or more processor(s) to:

establish the binding by sending a request from the user agent device that is designed to fail, and on receipt of a fail response, to take an action toward establishing the binding.

8. The computer system of claim 7, the instructions further programmed to cause the one or more processor(s) to:

in response to a request from the user agent device to test an ordering of the IP addresses stored in the user agent device's DNS address cache, receive a failure response, and in response thereto, invalidate the received IP addresses.

9. The computer system of claim 7, the instructions further programmed to cause the one or more processor(s) to:

in response to a request designed to invalidate the pinned first IP address in the user agent device's DNS address cache, receive a failure response, and in response thereto, rebind the first domain name to another of the addresses received in the IP address resource records.

10. The computer system of claim 2, wherein:

the designation of the class of domain names is encoded into a hostname of the initialization request.

11. The computer system of claim 2, wherein:

the designation of a class of domain names is a specification of a specific second domain name specified in a request from the user agent device.

12. The computer system of claim 2, wherein:

the designation of a class of domain names is a specification of a class of service to be requested, to be submitted to the domain name server to be resolved to a specific IP address belonging to a computer belonging to the second domain name from among a plurality of computers having the capability to provide the requested service.

13. A method, comprising steps of:

at a domain name server at a first domain name, receiving an initialization request from a user agent device, the initialization request designating a class of domain names to be resolved to an Internet Protocol (IP) address belonging to a second domain name, to which the user agent device seeks to issue a safe cross-domain request to be subsequently directed to the first domain name, the second domain name being a public domain name that is different than the first domain name;

establishing in a Domain Name System (DNS) address cache a binding of the first domain name to an IP address belonging to the second domain name, and sending messages to enable the user agent device to issue an Hypertext Transfer Protocol (HTTP) request addressed to the first domain name and to be routed to the IP address that belongs to or is to be resolved to a computer of the second domain name, to be serviced by a computer at the second domain name.

14. The method of claim 13, further comprising steps of:

sending a response to the user agent device, the response providing two or more IP address resource records resolving the designation of the class of domain names:

one of the provided IP address resource records having a first IP address belonging to a computer within the domain of the first domain name, and other of the provided IP address resource records having IP addresses for computers within domains belonging to the designated class of domain names, and having been evaluated by the domain name server to be eligible to service the safe cross-domain request to be subsequently issued by the user agent device; and ensuring that the first domain name is pinned to the first IP address in the DNS address cache, being the DNS address cache of the user agent device, and that at least one other of the IP addresses from the IP address resource records is/are stored in the user agent device's DNS address cache as alternative binding(s) to the first domain name.

15. The method of claim 14, further comprising the step of:

sending a message to the user agent device to cause the user agent device to unpin the first IP address, and to bind the first domain name to an alternative one of the IP addresses from among the other stored IP addresses.

16. The method of claim 14, further comprising the step of:

managing a pool of IP addresses corresponding to the first domain name, an IP address to be checked out of the pool for a period of time to maintain disambiguation among pending requests to bind the first domain name to IP addresses belonging to the second domain name.

17. The method of claim 14, further comprising the step of:
receiving a failure response designed to invalidate the pinned first IP address in the user agent device's DNS address cache, and causing the user agent device's DNS address cache to rebind the hostname formerly associated with the invalidated IP address in the DNS cache from the invalidated IP address to another of the addresses provided in the IP address resource records.

18. The method of claim 13, further comprising the step of:
establishing the binding at least in part by sending a request from the user agent device that is designed to fail, and on receipt of a fail response, taking an action toward establishing the binding.

19. The method of claim 18, further comprising the step of:
in response to a request from the user agent device to test an ordering of the IP addresses stored in the user agent device's DNS address cache, receiving a failure response designed to indicate to the user agent device that the IP addresses are not in a desired order.

20. The method of claim 13, further comprising the step of:
evaluating the initialization request, which designates the class of domain names as qualification of a fully-qualified hostname within the first domain name, to identify the class of domain names to be resolved to the IP address that belongs to or is to be resolved to a computer of the second domain name.

21. The method of claim 13, further comprising the step of:
evaluating the initialization request to identify a specific second domain name specified in the initialization request.

22. The method of claim 13, further comprising the step of:
evaluating the initialization request to identify a class of domain names specified in the initialization request, being a designation of a service requested by the user agent device, and resolving the designation of service to a specific IP address belonging to a computer belonging to the second domain name from among a plurality of computers having the capability to provide the requested service.

23. A domain name server, comprising:
one or more processors designed to execute instructions;
an internet connection at which the domain name server is programmed to receive and send messages at a first domain name;
one or more non-transitory, machine-readable memories having stored therein program instructions for execution by the one or more processor(s), the instructions programmed to cause the one or more processor(s) to:
receive an initialization request from a user agent device, the initialization request designating a class of domain names to be resolved to an Internet Protocol (IP) address belonging to a second domain name, to which the user agent device seeks to issue a safe cross-domain request to be subsequently directed to the first domain name, the second domain name being a public domain name that is different than the first domain name;
establish in a Domain Name System (DNS) address cache a binding of the first domain name to an IP address belonging to the second domain name, and to send messages to enable the user agent device to issue an Hypertext Transfer Protocol (HTTP) request addressed to the first domain name and to be routed to the IP address that belongs to or is to be resolved to a computer of the second domain name, to be serviced by a computer at the second domain name.

24. The domain name server of claim 23, the instructions being further programmed to cause the one or more processor(s) to:
at the user agent device, receive a response from the domain name server, the response returning to the user agent device two or more IP address resource records resolving the designation of the class of domain names:
one of the returned IP address resource records having a first IP address belonging to a computer within the domain of the first domain name,
other of the returned IP address resource records having IP addresses for computers within domains belonging to the designated class of domain names, and having been evaluated by the domain name server to be eligible to service the safe cross-domain request to be subsequently issued by the user agent device;
ensure that the first domain name is pinned to the first IP address in a DNS address cache of the user agent device, and that, simultaneously, at least one other of the IP addresses from the IP address resource records is/are stored in the user agent device's DNS address cache as alternative binding(s) to the first domain name.

25. The domain name server of claim 24, the instructions being further programmed to cause the one or more processor(s) to:
at the user agent device, unpin the pinned first IP address and binding to the first domain name an alternative one of the IP addresses chosen from among the stored IP addresses.

26. The domain name server of claim 24, the instructions being further programmed to cause the one or more processor(s) to:
manage a pool of IP addresses belonging to the first domain name, an IP address to be checked out of the pool for a period of time to maintain disambiguation among pending requests to bind the first domain name to IP addresses belonging to the second domain name.

27. The domain name server of claim 23, the instructions being further programmed to cause the one or more processor(s) or target belonging to the second domain name to:
send a failure response to the user agent device, the failure response designed to advance the user agent device toward binding the first domain name to an IP address belonging to the second domain name.

28. The domain name server of claim 27, instructions being further programmed to cause the user agent device to:
in response to a request from the user agent device to test an ordering of the IP addresses stored in the user agent device's DNS address cache, receive a failure response designed to indicate to the user agent device that the IP addresses are not in a desired order.

29. The domain name server of claim 27, instructions being further programmed to cause the user agent device to:
ensure that the first domain name is pinned to the first IP address in a DNS address cache of the user agent device;
receive a failure response designed to invalidate the pinned first IP address in the user agent device's DNS address cache, and cause the user agent device's DNS address cache to rebind the associated hostname to another of the addresses received in the IP address resource records.

30. The domain name server of claim 23, the instructions being further programmed to cause the one or more processor(s) to:
   evaluate the initialization request, which designates the class of domain names as qualification of a fully-qualified hostname within the first domain name, to identify the class of domain names to be resolved to the IP address that belongs to or is to be resolved to a computer of the second domain name.

31. The domain name server of claim 23, the instructions being further programmed to cause the one or more processor(s) to:
   evaluate the initialization request to identify a specific second domain name specified in the initialization request, and to resolve that second domain name to an IP address belonging to that second domain name, to be returned to the user agent device.

32. The domain name server of claim 23, the instructions being further programmed to cause the one or more processor(s) to:
   evaluate the initialization request to identify a class of domain names specified in the initialization request, being a designation of a service requested by the user agent device, and to resolve the designation of service to a specific IP address belonging to a computer belonging to the second domain name from among a plurality of computers having the capability to provide the requested service.

33. A method, comprising steps of:
   at a user agent device, issuing an initialization request to a domain name server at a first domain name, the initialization request designating a class of domain names to be resolved to an Internet Protocol (IP) address belonging to a second domain name from which the user agent device seeks to request a safe cross-domain service, the second domain name being different than the first domain name;
   at the user agent device, receiving a response from the domain name server, the response returning to the user agent device two or more IP address resource records resolving the designation of the class of domain names:
      one of the returned IP address resource records having a first IP address belonging to a computer within the domain of the first domain name,
      other of the returned IP address resource records having IP addresses for computers within domains belonging to the designated class of domain names, and having been evaluated by the domain name server to be eligible to service the safe cross-domain service requested by the user agent device;
   ensuring that the first domain name is pinned to the first IP address in a Domain Name System (DNS) address cache of the user agent device, and that, simultaneously, at least one other of the IP addresses from the IP address resource records is/are stored in the user agent device's DNS address cache as alternative binding(s) to the first domain name;
   at the user agent device, in response to a request to the first IP address, unpinning the first IP address and binding to the first domain name an alternative one of the IP addresses chosen from among the other stored IP addresses; and
   from the user agent device, issuing a request to a computer of the second domain name by sending a request addressed to the first domain name, and by the DNS address cache, resolving the first domain name to an IP address that belongs to or is to be resolved to a computer of the second domain name.

34. The method of claim 33, wherein:
   the initialization request designates the service to be requested by qualification of a hostname within the first domain name.

35. The method of claim 34, further comprising:
   ensuring the pinning by a loop of attempts to establish the pin of the first IP address to the first domain name.

36. The method of claim 34, further comprising:
   ensuring the pinning by a issuing a set of parallel requests to establish the pin of the first IP address to the first domain name.

37. The method of claim 33, further comprising the step of:
   establishing the binding by sending a request from the user agent device that is designed to fail, and on receipt of a fail response, taking an action toward establishing the binding.

38. The method of claim 33, wherein:
   the designation of a class of domain names is a specification of a specific second domain name.

39. The method of claim 33, wherein:
   the designation of a class of domain names is encoded into a hostname of the initialization request.

40. The method of claim 33, wherein:
   the designation of a class of domain names is a specification of a class of service to be requested, submitted to the domain name server to be resolved to a specific second domain name from among a plurality of computers having the capability to provide the requested service.

41. A method, comprising steps of:
   at a domain name server at a first domain name, receiving an initialization request from a user agent device, the initialization request designating a class of domain names to be resolved to an Internet Protocol (IP) address belonging to a second domain name to which the user agent device seeks to issue a safe cross-domain request, the second domain name being different than the first domain name;
   sending a response to the user agent device, the response providing two or more internet protocol (IP) address resource records resolving the designation of the class of domain names:
      one of the IP address resource records having a first IP address belonging to a computer within the domain of the first domain name,
      other of the provided IP address resource records having IP addresses for computers within domains belonging to the designated class of domain names, and having been evaluated by the domain name server to be eligible to service the safe cross-domain request to be subsequently issued by the user agent device;
   ensuring that the first domain name is pinned to the first IP address in a Domain Name System (DNS) address cache of the user agent device, and that, simultaneously, at least one other of the IP addresses from the IP address resource records is/are stored in the user agent device's DNS address cache as alternative binding(s) to the first domain name;
   sending a message to the user agent device to cause the user agent device to unpin the first IP address, and to bind the first domain name to an alternative one of the IP addresses from among the other stored IP addresses, and sending messages to enable the user agent device to issue an HTTP request addressed to the first domain name and to be routed to the IP address that belongs to or is to be resolved to a computer of the second domain name, to be serviced by a computer at the second domain name.

42. The method of claim 41, further comprising the step of:
managing a pool of IP addresses corresponding to the first domain name, an IP address to be checked out of the pool for a period of time to maintain disambiguation among pending requests to bind the first domain name to IP addresses belonging to the second domain name.

43. The method of claim 41, further comprising the step of:
establishing the binding by sending a request from the user agent device that is designed to fail, and on receipt of a fail response, taking an action toward establishing the binding.

44. The method of claim 41, further comprising the step of:
analyzing a hostname of the initialization request to obtain the designation of the class of domain names, and resolving the designation to the second domain name.

45. The method of claim 41, wherein:
analyzing the initialization request to obtain a class of service requested by the user agent device, and resolving that service to a second domain name of a computer designed to provide that service to the requesting user agent device.

46. A domain name server, comprising:
one or more processors designed to execute instructions;
an internet connection at which the domain name server is programmed to receive and send messages at a first domain name;
one or more non-transitory, machine-readable memories having stored therein program instructions for execution by the one or more processor(s), the instructions programmed to cause the one or more processor(s) to:
receive an initialization request from a user agent device, the initialization request designating a class of domain names to be resolved to an internet protocol (IP) address belonging to a second domain name to which the user agent device seeks to issue a safe cross-domain request, the second domain name being different than the first domain name;
send a response to the user agent device, the response providing two or more IP address resource records resolving the designation of the class of domain names:
one of the IP address resource records having a first IP address belonging to a computer within the domain of the first domain name,
other of the provided IP address resource records having IP addresses for computers within domains belonging to the designated class of domain names, and having been evaluated by the domain name server to be eligible to service the safe cross-domain request to be subsequently issued by the user agent device;
ensure that the first domain name is pinned to the first IP address in a Domain Name System (DNS) address cache of the user agent device, and that, simultaneously, at least one other of the IP addresses from the IP address resource records are stored in the user agent device's DNS address cache as alternative binding(s) to the first domain name;
send a message to the user agent device to cause the user agent device to unpin the first IP address, and to bind the first domain name to an alternative one of the IP addresses from among the other stored IP addresses, and to send messages to enable the user agent device to issue an HTTP request addressed to the first domain name and to be routed to an IP address that belongs to or is to be resolved to a computer of the second domain name, to be serviced by a computer at the second domain name.

47. The domain name server of claim 46, the instructions being further programmed to cause the one or more processor(s) to:
manage a pool of IP addresses corresponding to the first domain name, an IP address to be checked out of the pool for a period of time to maintain disambiguation among pending requests to bind the first domain name to IP addresses belonging to the second domain name.

48. The domain name server of claim 46, the instructions being further programmed to cause the one or more processor(s) to:
send a failure response to the user agent device, the failure response designed to advance the user agent device toward binding the first domain name to an IP address belonging to the second domain name.

49. The domain name server of claim 46, the instructions being further programmed to cause the one or more processor(s) to:
evaluate the initialization request, which designates the class of domain names as qualification of a fully-qualified hostname within the first domain name, to identify the class of domain names to be resolved to the second IP address.

50. The domain name server of claim 46, the instructions being further programmed to cause the one or more processor(s) to:
evaluate the initialization request to identify a specific second domain name specified in the initialization request, and to resolve that second domain name to an IP address belonging to that second domain name to return to the user agent device.

51. The domain name server of claim 46, the instructions being further programmed to cause the one or more processor(s) to:
evaluate the initialization request to identify a class of domain names specified in the initialization request, being a designation of a service requested by the user agent device, and to resolve the designation of service to a specific IP address belonging to a computer belonging to the second domain name from among a plurality of computers having the capability to provide the requested service.

52. A method, comprising steps of:
in a Domain Name System (DNS) address cache, establishing, concurrently, two or more internet protocol (IP) addresses for translation of a single domain name;
sending a request over the internet to the domain name, including resolving the single domain name of the request to a one of the IP addresses in the DNS address cache;
receiving a reply to the request, and evaluating the source of the reply to ascertain whether that source is an IP address whose binding to the single domain name is not a desired IP address translation of the single domain name; and if the evaluating determines that the reply is received from an undesired node of the internet, invalidating the translation from the single domain name to the IP addresses of the undesired node from the DNS address cache.

53. The method of claim 52, further comprising steps of:
at a user agent device, issuing an initialization request to a domain name server at the single domain name, the initialization request designating a class of domain names to be resolved to an IP address belonging to a second domain name, from which the user agent device is to seek to issue a safe cross-domain request to be subsequently directed to the single domain name, the second domain name being a public domain name that is different than the single domain name;
in the DNS address cache, establishing a binding of the single domain name to an IP address belonging to the second domain name; and
from the user agent device, sending a cross-domain Hypertext Transfer Protocol (HTTP) request addressed to the single domain name and routed to the IP address that belongs to or is to be resolved to a computer of the second domain name, to be serviced by a computer at the second domain name.

54. The method of claim 52, further comprising steps of:
at a user agent device, issuing an initialization request to a domain name server at the single domain name, the initialization request designating a class of domain names to be resolved to an IP address belonging to a second domain name from which the user agent device seeks to request a safe cross-domain service, the second domain name being different than the single domain name;
at the user agent device, receiving a response from the domain name server, the response returning to the user agent device two or more IP address resource records resolving the designation of the class of domain names:
  one of the returned IP address resource records having a first IP address belonging to a computer within the domain of the single domain name,
  other of the returned IP address resource records having IP addresses for computers within domains belonging to the designated class of domain names, and having been evaluated by the domain name server to be eligible to service the cross-domain service requested by the user agent device;
ensuring that the single domain name is pinned to the first IP address in the DNS address cache, the DNS cache being at the user agent device, and that, simultaneously, at least one other of the IP addresses from the IP address resource records is/are stored in the user agent device's DNS address cache as alternative binding(s) to the single domain name;
at the user agent device, in response to a request to the first IP address, unpinning the first IP address and binding to the single domain name an alternative one of the IP addresses chosen from among the other IP addresses stored in the user agent device's DNS cache; and
from the user agent device, issuing a request to a computer of the second domain name by sending a request addressed to the single domain name, and by the DNS address cache, resolving the single domain name to an IP address that belongs to or is to be resolved to a computer of the second domain name.

* * * * *